United States Patent [19]

Calundann

[11] 4,279,803
[45] Jul. 21, 1981

[54] POLYESTER OF PHENYL-4-HYDROXYBENZOIC ACID AND 4-HYDROXYBENZOIC ACID AND/OR 6-HYDROXY-2-NAPHTHOIC ACID CAPABLE OF FORMING AN ANISOTROPIC MELT

[75] Inventor: Gordon W. Calundann, N. Plainfield, N.J.

[73] Assignee: Celanese Corporation, New York, N.Y.

[21] Appl. No.: 128,778

[22] Filed: Mar. 10, 1980

[51] Int. Cl.³ ............................................. C08L 67/04
[52] U.S. Cl. ................................. 260/40 P; 260/40 R; 528/206; 528/298; 528/305
[58] Field of Search ........................... 260/40 R, 40 P; 528/206

[56] References Cited

U.S. PATENT DOCUMENTS

| | | |
|---|---|---|
| 4,067,852 | 1/1978 | Calundann ........................ 260/40 R |
| 4,130,545 | 12/1978 | Calundann ........................ 260/40 R |
| 4,161,470 | 7/1979 | Calundann ........................ 260/40 R |
| 4,184,996 | 1/1980 | Calundann ........................ 260/40 R |
| 4,219,461 | 8/1980 | Calundann ........................ 260/40 R |

*Primary Examiner*—Lewis T. Jacobs
*Attorney, Agent, or Firm*—Kenneth A. Genoni

[57] ABSTRACT

A novel polyester is provided which has been found to exhibit an optically anisotropic melt phase at a temperature which enables it readily to undergo melt processing to form quality fibers, films, molded articles, etc. The polyester contains substantial concentrations of recurring 3-phenyl-4-oxybenzoyl and/or 2-phenyl-4-oxybenzoyl moieties in combination with 4-oxybenzoyl and/or 6-oxy-2-naphthoyl moieties in the proportions indicated. The wholly aromatic polyester is capable of forming the desired anisotropic melt at a temperature below approximately 350° C.

39 Claims, No Drawings

POLYESTER OF PHENYL-4-HYDROXYBENZOIC ACID AND 4-HYDROXYBENZOIC ACID AND/OR 6-HYDROXY-2-NAPHTHOIC ACID CAPABLE OF FORMING AN ANISOTROPIC MELT

BACKGROUND OF THE INVENTION

Wholly aromatic polyester resins long have been known. For instance, 4-hydroxybenzoic acid homopolymer and copolymers have been provided in the past and were commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldewell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975); and (d) *Poly(p-Oxybenzoyl Systems): Homopolymer for Coatings: Copolymers for Compression and Injection Molding*, by Roger S. Storm and Steven G. Cottis, Coatings Plast. Preprint, Vol. 34, No. 1, Pages 194 to 197 (April 1974). See also, U.S. Pat. Nos. 3,039,994; 3,169,121; 3,321,437; 3,549,593; 3,553,167; 3,637,595; 3,651,014; 3,723,388; 3,759,870; 3,767,621; 3,778,410; 3,787,370; 3,790,528; 3,829,406; 3,890,256; and 3,975,487. U.S. Pat. No. 3,549,593 discloses certain aromatic polyesters of hydroxybenzoic acids wherein every moiety of the polyester is substituted by alkyl and/or aryl groups (i.e., a phenyl group).

Also, it more recently has been disclosed that certain polyesters may be formed which exhibit melt anisotropy. See for instance, (a) *Polyester X7G-A Self Reinforced Thermoplastic*, by W. J. Jackson Jr., H. F. Kuhfuss, and T. F. Gray, Jr., 30th Anniversary Technical Conference, 1975 Reinforced Plastics/Composites Institute. The Society of the Plastics Industry, Inc., Section 17-D, Pages 1 to 4, (b) Belgian Pat. Nos. 838,935 and 828,936, (c) Dutch Pat. No. 7505551, (d) West German Nos. 2520819, 2520820, 2722120, 2834535, 2834536 and 2834537, (e) Japanese Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,153,779; 4,156,070; 4,159,365; 4,161,470; and 4,169,933; and (g) U.K. application No. 2,002,404. See also commonly assigned U.S. Ser. Nos. 877,917, filed Feb. 15, 1978 (now U.S. Pat. No. 4,184,996, issued Nov. 22, 1980); 10,392, filed Feb. 8, 1979, and 10,393, filed Feb. 8, 1979 (now U.S. Pat. Nos. 4,238,599 and 4,238,598, respectively, issued Dec. 9, 1980) 21,050, filed Mar. 16, 1979 (now U.S. Pat. No. 4,224,433, issued Sept. 23, 1980); 32,086, filed Apr. 23, 1979 (now U.S. Pat. No. 4,219,461, issued Aug. 26, 1980); and 54,049, filed July 2, 1979.

In my commonly assigned U.S. Ser. No. 128,759, filed concurrently herewith, entitled "Polyester of Phenyl-4-Hydroxybenzoic Acid, Aromatic Diol, and Aromatic Diacid Capable of Forming an Anisotropic Melt" is disclosed another wholly aromatic polyester which readily undergoes melt processing.

It is an object of the present invention to provide an improved wholly aromatic polyester which particularly is suited for the formation of quality molded articles, melt extruded fibers, and melt extruded films.

It is an object of the present invention to provide an improved melt processable wholly aromatic polyester capable of forming an anisotropic melt phase at a temperature below approximately 350° C.

It is an object of the present invention to provide a novel wholly aromatic polyester which can be formed on a more economical basis since only a portion of the aromatic rings present therein are substituted.

It is an object of the present invention to provide an improved wholly aromatic polyester which forms a highly tractable melt phase.

It is an object of the present invention to provide an improved wholly aromatic polyester which forms an anisotropic melt phase at a temperature well below its decomposition temperature and which may form quality high performance fibers.

It is an object of the present invention to provide improved wholly aromatic polyester fibers of relatively high strength and modulus which particularly are suited for use as fibrous reinforcement in a rubber matrix.

It is another object of the present invention to provide an improved wholly aromatic polyester which readily may be melt extruded to form a film.

It is another object of the present invention to provide an improved wholly aromatic polyester which readily may be injection molded to form a molded article (which optionally may be fiber and/or filler reinforced).

These and other objects, as well as the scope, nature and utilization of the present invention will be apparent to those skilled in the art from the following detailed description.

SUMMARY OF THE INVENTION

It has been found that a melt processable wholly aromatic polyester capable of forming an anisotropic melt phase at a temperature below approximately 350° C. consists essentially of moieties I and II wherein:

I is selected from the group consisting of:

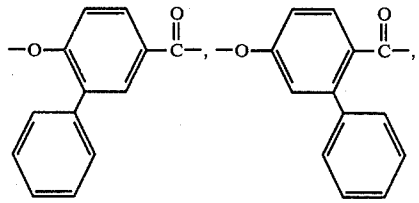

and mixtures thereof, and

II is selected from the group consisting of:

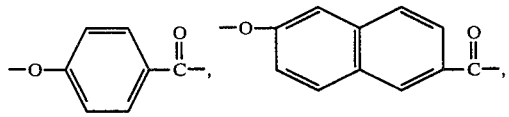

and mixtures thereof, wherein moiety I is present in a concentration of approximately 20 to 90 mole percent, and moiety II is present in a concentration of approximately 10 to 80 mole percent, and wherein the total molar concentration of moieties I and II in said wholly aromatic polyester is at least 90 percent.

DESCRIPTION OF PREFERRED EMBODIMENTS

The wholly aromatic polyester of the present invention consists essentially of at least two recurring moieties which when combined in the polyester have been found to form an atypical optically anisotropic melt phase at a temperature below approximately 350° C. The polymer melting temperatures may be confirmed by the use of a differential scanning calorimeter (i.e., DSC) employing repeat scans at a 20° C. per minute heat-up rate and observing the peak of the DSC melt transition. The polyester commonly exhibits a differential scanning calorimeter melting temperature within the range of approximately 240° to 345° C., or a softening temperature within such range in those instances in which the polymer is amorphous. Because of its ability to exhibit anisotropic properties (i.e., liquid crystalline properties) in the melt, the polyester readily can form a product having a highly oriented molecular structure upon melt processing. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

The first essential moiety (i.e., moiety I) of the wholly aromatic polyester of the present invention is either a 3-phenyl-4-oxybenzoyl moiety or a 2-phenyl-4-oxybenzoyl moiety, or a mixture thereof. Such can be illustrated by the formulas:

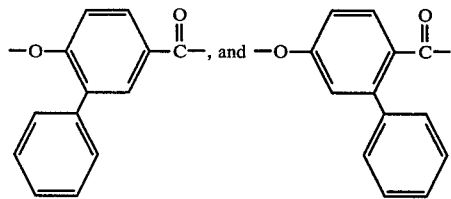

respectively. Moiety I can be derived from 3-phenyl-4-hydroxybenzoic acid and/or 2-phenyl-4-hydroxybenzoic acid and the derivatives thereof. The required starting material for moiety I can be formed by the Kolbe-Schmitt reaction whereby the appropriate phenyl substituted phenol is reacted with carbon dioxide in accordance with known techniques.

Moiety I comprises approximately 20 to 90 mole percent of the wholly aromatic polyester. In a preferred embodiment moiety I is present in a concentration of approximately 40 to 70 mole percent, and most preferably in a concentration of about 40 to 60 mole percent (e.g., approximately 60 mole percent). It has been found that if one forms a homopolymer consisting solely of a structure previously illustrated for moiety I, then the resulting polyester is largely intractable.

The second essential moiety (i.e., moiety II) is either a 4-oxybenzoyl moiety or a 6-oxy-2-naphthoyl moiety, or a mixture thereof. Such can be illustrated by the formulas:

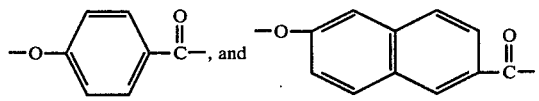

respectively. Moiety II can be derived from unsubstituted 4-hydroxybenzoic acid and/or unsubstituted 6-hydroxy-2-naphthoic acid or the derivatives thereof. 4-hydroxybenzoic acid is commercially available. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety II comprises approximately 20 to 80 mole percent of the wholly aromatic polyester. In a preferred embodiment moiety II is present in a concentration of approximately 30 to 60 mole percent, and most preferably in a concentration of approximately 40 to 60 mole percent (e.g., approximately 40 mole percent).

Other aryl ester-forming moieties (e.g. dicarboxy units, dioxy units and/or other combined oxy and carboxy units) other than moieties I and II additionally may be included in the wholly aromatic polyester of the present invention in a minor concentration (e.g. up to about 10 mole percent) so long as such moieties do not adversely influence the desired anisotropic melt phase exhibited by the polyester heretofore defined and do not raise the melting temperature of the resulting polymer above that specified. As will be apparent to those skilled in the art, the total molar quantities of dicarboxy units and dioxy units present within the wholly aromatic polyester will be substantially equal. A minor quantity of 3-oxybenzoyl moiety which is derived from 3-hydroxybenzoic acid optionally may be included in the wholly aromatic polyester together with moieties I and II. This component has the propensity to soften the polymer and reduce or eliminate high order crystallinity thus increasing the amorphous nature of the polymer.

In a preferred embodiment the wholly aromatic polyester is formed solely of moieties I and II (i.e., the molar concentration of moieties I and II in the wholly aromatic polyester is substantially 100 percent). Accordingly, the reactants are inherently stoichiometrically balanced thereby greatly simplifying polymer formation since the importance of precise reactant measurement is minimized, and the polymerization reaction will tend to proceed to a relatively high molecular weight, relatively uniform product without difficulty.

The wholly aromatic polyester of the present invention commonly exhibits

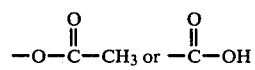

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

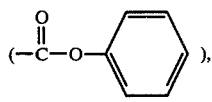

and methylester

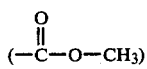

optionally may be included at the end of the polymer chains. The polymer also may be oxidatively crosslinked to at least some degree, if desired, by heating in a oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluroisopropanol and o-chlorophenol, and accordingly are not susceptible to solution processing. They can surprisingly be readily processed by common melt processing techniques as discussed hereafter. Most compositions are soluble to some degree in pentafluorophenol.

The wholly aromatic polyester of the present invention commonly exhibits a weight average molecular weight of about 2,000 to 200,000 and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The wholly aromatic polyester prior to heat treatment additionally commonly exhibits an inherent viscosity (i.e., I.V.) of at least approximately 2.0 dl./gm. and preferably at least approximately 2.5 dl./gm. (e.g., approximately 2.5 to 5.0 dl./gm.) when dissolved in a concentration of 0.1 percent by weight in pentafluorophenol at 60° C.

The wholly aromatic polyesters of the present invention commonly may be considered crystalline in the sense that fibers melt extruded therefrom exhibit x-ray diffraction patterns using Ni-filtered CuKα radiation and flat plate cameras characteristic of polymeric crystalline materials. Alternatively, the wholly aromatic polyester of the present invention in some instances may be considered to be amorphous in character. Also, under some circumstances crystallinity can be imparted to the same by annealing (i.e., heat treating in the solid state). In spite of the crystallinity commonly observed, the wholly aromatic polyester of the present invention nevertheless may be easily melt processed in all instances.

Unlike the aromatic polyesters commonly encountered in much of the prior art, the wholly aromatic polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase conveniently may be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described a slurry polymerization process which may be employed to form the wholly aromatic polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which moieties I and II are derived may be initially provided in a modified form whereby the usual hydroxyl groups of the monomers are esterified (i.e., they are provided as acyl esters). For instance, lower acyl esters of 3-phenyl-4-hydroxybenzoic acid, 2-phenyl-4-hydroxybenzoic acid, 4-hydroxybenzoic acid, and 6-hydroxy-2-naphthoic acid, wherein the hydroxy groups are esterified may be provided as reactants. The lower acyl groups preferably have from about 2 to about 4 carbon atoms. Preferably the acetate esters of the organic compounds which form moieties I and II are provided. Accordingly, particularly preferred reactants for the condensation reaction are 3-phenyl-4-acetoxybenzoic acid, 2-phenyl-4-acetoxybenzoic acid, 4-acetoxybenzoic acid, and 6-acetoxy-2-naphthoic acid.

Representative catalysts which optionally may be employed in either the melt hydrolysis procedure or in the procedure of U.S. Pat. No. 4,067,852 include dialkyl tin oxide (i.e., dibutyl tin oxide), diaryl tin oxide, titanium dioxide, alkoxy titanium silicates, titanium alkoxides, alkali and alkaline earth metal salts of carboxylic acids (e.g., sodium acetate), the gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g., in a nitrogen atmosphere) at a temperature of about 260° C. for 10 to 12 hours.

The wholly aromatic polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight (e.g., 10 to 35 percent by weight) of a solid filler (e.g., talc) and/or reinforcing agent (e.g., glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice at a temperature above its melting point, e.g., a temperature of about 300° to 320° C. in preferred embodiments.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 10° to 20° C. below the temperature at which it melts for about 45 hours. Optimum heat treatment conditions will vary with the specific composition of the wholly aromatic polyester and with the fiber's process history.

The as-spun fibers formed from the wholly aromatic polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), an average single filament tensile modulus of at least about 300 grams per denier (e.g., about 300 to 1000 grams per denier), and exhibit an extraordinary dimensional stability at elevated temperatures (e.g., at temperatures of about 150° to 200° C.). Following thermal treatment (i.e., annealing) the fibers commonly exhibit an average single filament tenacity of at least 10 grams per denier (e.g., 10 to 30 grams per denier), and an average single filament tensile modulus of at least 300 grams per denier measured at ambient conditions (e.g., 72° F. and 65 percent relative humidity). Such properties enable the fibers to be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film, etc. The fibers and films exhibit an inherent resistance to burning.

The following examples are presented as specific illustrations of the claimed invention. It should be understood, however, that the invention is not limited to the specific details set forth in the examples.

EXAMPLE I

To a 300 ml. three-neck flask fitted with an oil-sealed glass paddle stirrer, a gas inlet tube, distillation head, and condenser leading to a measuring cylinder were added the following:

(a) 51.2 grams 3-phenyl-4-acetoxybenzoic acid (0.20 mole), and (b) 54.0 grams 4-acetoxybenzoic acid (0.30 mole)

The flask was heated to 250° C. in an oil bath with stirring while a slow stream of argon passed through the system to purge air. Acetic acid soon began to distill over as the reaction commenced, and its rate of evolution was observed from the volume of acetic acid collected in the measuring cylinder. After approximately 39 minutes the temperature of the oil bath was raised to 280° C. and held there for approximately 40 minutes. It was then raised to 320° C. and held there for approximately 77 minutes. During both of these periods the opaque reaction melt was vigorously stirred under a constant stream of argon. By this time a total of 27 ml. of acetic acid had collected. Reduced pressure was not imposed, the stirrer was withdrawn, and the viscous, pearly, tan-colored melt was left to cool under a stream of argon.

The flask containing the wholly aromatic polyester product was broken, the polymer plug was removed and cooled in liquid nitrogen and then ground in a mill.

The resulting shredded polymer was washed with acetone and then petroleum ether in a Soxhetl apparatus, and then dried.

The inherent viscosity (I.V.) of the polymer was 2.70 as determined in a pentafluorophenol solution of 0.1 percent by weight concentration at 60° C. in accordance with the formula:

$$I.V. = \frac{\ln(\eta rel)}{c}$$

where c=concentration of solution (0.1 percent by weight) and ηrel=relative viscosity. When the polymer was subjected to differential scanning calorimetry (20° C./min. heating rate), it exhibited a glass transition temperature of approximately 125° C. and a small melt endotherm at about 249° C. The polymer melt was optically anisotropic.

The polymer was micro-melt extruded into a continuous filament through a single hole spinneret at 340° C. with a take-up rate of 150 meters per minute. The extruded fiber was quenched in ambient air (i.e., at 72° F. and 65 percent relative humidity).

The resulting as-spun wholly aromatic polyester fiber exhibited the following average single filament properties:
Tenacity (grams per denier): 5.36
Tensile modulus (grams per denier): 441
Elongation (percent): 1.38
Following thermal treatment in a nitrogen stream at 250° C. for 24 hours, 275° C. for 24 hours, and then 300° C. for 48 hours while in a free to shrink configuration the fiber exhibited the following average single filament properties:
Tenacity (grams per denier): 11.7
Tensile modulus (grams per denier): 491
Elongation (percent): 2.75
The fiber also exhibited a low degree of shrinkage at elevated temperatures and a good retention of tenacity and tensile modulus values at temperatures up to about 150° to 200° C.

EXAMPLE II

To a 300 ml. three-neck flask fitted with an oil-sealed glass paddle stirrer, a gas inlet tube, distillation head, and condenser leading to a measuring cylinder were added the following:

(a) 41.0 grams 3-phenyl-4-acetoxybenzoic acid (0.16 mole), and (b) 55.2 grams 6-acetoxy-2-naphthoic acid (0.24 mole)

The flask was heated to 250° C. in an oil bath with stirring while a slow stream of argon passed through the system. After approximately 82 minutes the temperature of the oil bath was increased to 280° C. and held there for approximately 46 minutes. It was then raised to 320° C. and held there for approximately 52 minutes while the viscous contents of the flask vigorously were stirred. By this time a total of 21 ml. of acetic acid had been collected. A reduced pressure was then imposed and the viscous polymer melt was stirred for an additional 25 minutes at 320° C. under a pressure of 0.4 mm. of mercury. Next, the system was vented to atmospheric pressure with argon, the stirrer was withdrawn, and the contents of the flask were left to cool under a slow stream of argon.

The flask containing the pearlescent, tan-colored polyester was broken, the polymer plug was removed and cooled in liquid nitrogen and then ground in a mill. The resulting shredded fibrous polymer was washed with acetone and then petroleum ether in a Soxhlet apparatus, and then dried.

The inherent viscosity (I.V.) of the polymer was 3.66 as determined in a pentafluorophenol solution of 0.1 percent by weight concentration at 60° C. in accordance with the formula:

$$I.V. = \frac{\ln(\eta rel)}{c}$$

where c=concentration of solution (0.1 percent by weight) and ηrel=relative viscosity. When the polymer was subjected to differential scanning calorimetry (20° C./min. heating rate), it exhibited a glass transition temperature of approximately 130° C. and showed no clearly discernable melt endotherm. The polymer melt was optically anisotropic.

The polymer was micro-melt extruded into a continuous filament through a single hole spinneret at 345° C. with a take-up rate of 525 meters per minute. The extruded fiber was quenched in ambient air (i.e., at 72° F. and 65 percent relative humidity).

The resulting as-spun wholly aromatic polyester fiber exhibited the following average single filament properties:
Tenacity (grams per denier): 5.81
Tensile modulus (grams per denier): 400
Elongation (percent): 1.97
When subjected to thermal treatment as described in Example I the above values are enhanced.

Although the invention has been described with preferred embodiments it is to be understood that variations and modifications may be employed without departing from the concept of the invention as defined in the following claims.

I claim:

1. A melt processable wholly aromatic polyester capable of forming an anisotropic melt phase at a temperature below approximately 350° C. consisting essentially of moieties I and II wherein:

I is selected from the group consisting of:

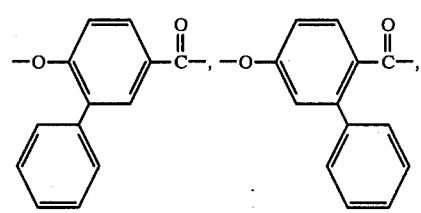

and mixtures thereof, and

II is selected from the group consisting of:

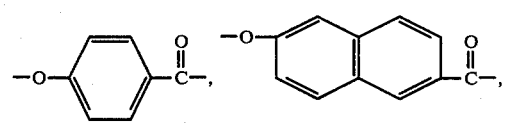

and mixtures thereof, wherein moiety I is present in a concentration of approximately 20 to 90 mole percent, and moiety II is present in a concentration of approximately 10 to 80 mole percent, and wherein the total molar concentration of moieties I and II in said wholly aromatic polyester is at least 90 percent.

2. A melt processable wholly aromatic polyester according to claim 1 which is capable of exhibiting a differential scanning calorimeter melting temperature within the range of approximately 240° to 345° C.

3. A melt processable wholly aromatic polyester according to claim 1 wherein moiety I is

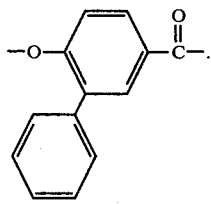

4. A melt processable wholly aromatic polyester according to claim 1 wherein moiety I is

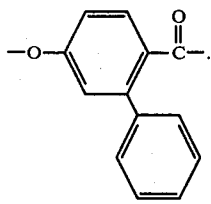

5. A melt processable wholly aromatic polyester according to claim 1 wherein moiety II is

6. A melt processable wholly aromatic polyester according to claim 1 wherein moiety II is

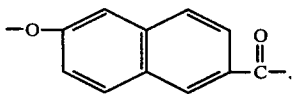

7. A melt processable wholly aromatic polyester according to claim 1 which exhibits an inherent viscosity of at least 2.0 dl./gm. when dissolved in a concentration of 0.1 percent by weight in pentafluorophenol at 60° C.

8. A melt processable wholly aromatic polyester according to claim 1 which exhibits an inherent viscosity of at least 2.5 dl./gm. when dissolved in a concentration of 0.1 percent by weight in pentafluorophenol at 60° C.

9. A melt processable wholly aromatic polyester according to claim 1 which consists essentially of approximately 40 to 70 mole percent of moiety I, and approximately 30 to 60 mole percent of moiety II.

10. A melt processable wholly aromatic polyester according to claim 1 which consists essentially of approximately 40 to 60 mole percent of moiety I, and approximately 40 to 60 mole percent of moiety II.

11. A fiber which has been melt spun from the wholly aromatic polyester of claim 1.

12. A film which has been melt extruded from the wholly aromatic polyester of claim 1.

13. A molded article comprising the melt processable wholly aromatic polyester of claim 1.

14. A molding compound comprising the melt processable wholly aromatic polyester of claim 1 which incorporates approximately 1 to 60 percent by weight of a solid filler and/or reinforcing agent.

15. A molding compound comprising the melt processable wholly aromatic polyester of claim 1 which incorporates approximately 10 to 35 percent by weight of a solid filler and/or reinforcing agent.

16. A melt processable wholly aromatic polyester capable of forming an anisotropic melt phase at a temperature below approximately 350° C. consisting essentially of moieties I and II wherein:

I is

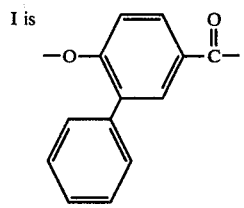

II is

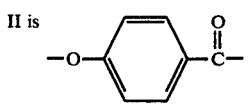

wherein moiety I is present in a concentration of approximately 20 to 90 mole percent, and moiety II is present in a concentration of approximately 10 to 80 mole percent, and wherein the total molar concentration of moieties I and II in said wholly aromatic polyester is at least 90 percent.

17. A melt processable wholly aromatic polyester according to claim 16 which is capable of exhibiting a differential scanning calorimeter melting temperature within the range of approximately 240° to 345° C.

18. A melt processable wholly aromatic polyester according to claim 16 which exhibits an inherent viscosity of at least 2.0 dl./gm. when dissolved in a concentration of 0.1 percent by weight in pentafluorophenol at 60° C.

19. A melt processable wholly aromatic polyester according to claim 16 which exhibits an inherent viscosity of at least 2.5 dl./gm. when dissolved in a concentration of 0.1 percent by weight in pentafluorophenol at 60° C.

20. A melt processable wholly aromatic polyester according to claim 16 which consists essentially of approximately 40 to 70 mole percent of moiety I, and approximately 30 to 60 mole percent of moiety II.

21. A melt processable wholly aromatic polyester according to claim 16 which consists essentially of approximately 40 to 60 mole percent of moiety I, and approximately 40 to 60 mole percent of moiety II.

22. A melt processable wholly aromatic polyester according to claim 16 wherein the total molar concentration of moieties I and II is substantially 100 percent.

23. A fiber which has been melt spun from the wholly aromatic polyester of claim 16.

24. A film which has been melt extruded from the wholly aromatic polyester of claim 16.

25. A molded article comprising the melt processable wholly aromatic polyester of claim 16.

26. A molding compound comprising the melt processable wholly aromatic polyester of claim 16 which incorporates approximately 1 to 60 percent by weight of a solid filler and/or reinforcing agent.

27. A molding compound comprising the melt processable wholly aromatic polyester of claim 16 which incorporates approximately 10 to 35 percent by weight of a solid filler and/or reinforcing agent.

28. A melt processable wholly aromatic polyester capable of forming an anisotropic melt phase at a temperature below approximately 350° C. consisting essentially of moieties I and II wherein:

I is 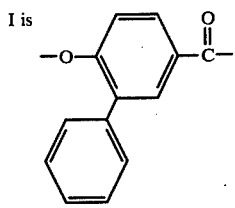

II is 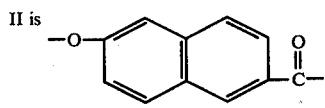

wherein moiety I is present in a concentration of approximately 20 to 90 mole percent, and moiety II is present in a concentration of approximately 10 to 80 mole percent, and wherein the total molar concentration of moieties I and II in said wholly aromatic polyester is at least 90 mole percent.

29. A melt processable wholly aromatic polyester according to claim 28 which is capable of exhibiting a differential scanning calorimeter melting temperature within the range of approximately 240° to 345° C.

30. A melt processable wholly aromatic polyester according to claim 28 which exhibits an inherent viscosity of at least 2.0 dl./gm. when dissolved in a concentration of 0.1 percent by weight in pentafluorophenol at 60° C.

31. A melt processable wholly aromatic polyester according to claim 28 which exhibits an inherent viscosity of at least 2.5 dl./gm. when dissolved in a concentration of 0.1 percent by weight in pentafluorophenol at 60° C.

32. A melt processable wholly aromatic polyester according to claim 28 which consists essentially of approximately 40 to 70 mole percent of moiety I, and approximately 30 to 60 mole percent of moiety II.

33. A melt processable wholly aromatic polyester according to claim 28 which consists essentially of approximately 40 to 60 mole percent of moiety I, and approximately 40 to 60 mole percent of moiety II.

34. A melt processable wholly aromatic polyester according to claim 28 wherein the total molar concentration of moieties I and II is substantially 100 percent.

35. A fiber which has been melt spun from the wholly aromatic polyester of claim 28.

36. A film which has been melt extruded from the wholly aromatic polyester of claim 28.

37. A molded article comprising the melt processable wholly aromatic polyester of claim 28.

38. A molding compound comprising the melt processable wholly aromatic polyester of claim 28 which incorporates approximately 1 to 60 percent by weight of a solid filler and/or reinforcing agent.

39. A molding compound comprising the melt processable wholly aromatic polyester of claim 28 which incorporates approximately 10 to 35 percent by weight of a solid filler and/or reinforcing agent.

* * * * *